United States Patent
Zhang (10) Patent No.: US 8,215,205 B2
(45) Date of Patent: Jul. 10, 2012

(54) WAVE GEAR DEVICE

(75) Inventor: Xin Yue Zhang, Azumino (JP)

(73) Assignee: Harmonic Drive Systems Inc., Shinagawa-Ku, Tokyo (JP)

( * ) Notice: Subject to any disclaimer, the term of this patent is extended or adjusted under 35 U.S.C. 154(b) by 394 days.

(21) Appl. No.: 12/693,486

(22) Filed: Jan. 26, 2010

(65) Prior Publication Data
US 2010/0212446 A1 Aug. 26, 2010

(30) Foreign Application Priority Data
Feb. 20, 2009 (JP) ................. 2009-037300

(51) Int. Cl.
*F16H 33/00* (2006.01)
(52) U.S. Cl. ........................................................ 74/640
(58) Field of Classification Search .................. 74/640
See application file for complete search history.

(56) References Cited

U.S. PATENT DOCUMENTS

| 2,906,143 | A | 9/1959 | Musser | |
|---|---|---|---|---|
| 7,117,759 | B2 * | 10/2006 | Ishikawa | 74/461 |
| 7,748,118 | B2 * | 7/2010 | Kobayashi et al. | 29/893.34 |
| 7,891,272 | B2 * | 2/2011 | Schonlau | 74/640 |
| 8,020,470 | B2 * | 9/2011 | Saito | 74/640 |
| 8,028,603 | B2 * | 10/2011 | Ishikawa | 74/640 |
| 8,051,566 | B2 * | 11/2011 | Kobayashi et al. | 29/893.34 |

FOREIGN PATENT DOCUMENTS

| JP | 45-41171 B | 12/1970 |
|---|---|---|
| JP | 04-128558 U | 11/1992 |
| JP | 07-167228 A | 7/1995 |
| JP | 10-159917 A | 6/1998 |
| JP | 2008-180259 A | 8/2008 |

* cited by examiner

*Primary Examiner* — Ha D. Ho
(74) *Attorney, Agent, or Firm* — Buchanan Ingersoll & Rooney PC (57) ABSTRACT

In a cup-type or "silk hat"-type wave gear device (1), the rim thickness t of the flexible externally toothed gear (3) thereof satisfies the relations $(0.5237\text{Ln}(R)-1.32)d \leq t \leq (0.8728\text{Ln}(R)-2.2)d$ if the reduction ratio R of the wave gear device is less than 80, and $(1.5499\text{Ln}(R)-5.8099)d \leq t \leq (2.5832\text{Ln}(R)-9.6832)d$ if the reduction ratio R is equal to or greater than 80, where d is the radial deflection, measured at the position of the major axis of the neutral circle of the rim, in a state in which the flexible externally toothed gear is bent into an elliptical shape. The effective face width L of the external teeth (35) is a value within the range of 21 to 30% of the pitch circle diameter. Such settings make it possible to increase the bottom fatigue strength of the flexible externally toothed gear and improve the load capacity of the wave gear device (1).

4 Claims, 8 Drawing Sheets

WAVE GEAR DEVICE

TECHNICAL FIELD

The present invention relates to a cup-type wave gear device comprising a cup-shaped flexible externally toothed gear, or to a "silk hat"-type wave gear device comprising a "silk hat"-shaped flexible externally toothed gear, and more particularly relates to an improvement technique for increasing the bottom fatigue strength of the flexible externally toothed gear and providing a strengthened wave gear device.

BACKGROUND ART

After the wave gear device (Patent Document 1: U.S. Pat. No. 2,906,143) was invented by the original inventor C. W. Musser, a variety of inventions have been devised by many researchers. For example, wave gear devices are disclosed in Patent Document 2 (JP-B 45-41171) and Patent Document 3 (JP-A 7-167228).

Figure 1:
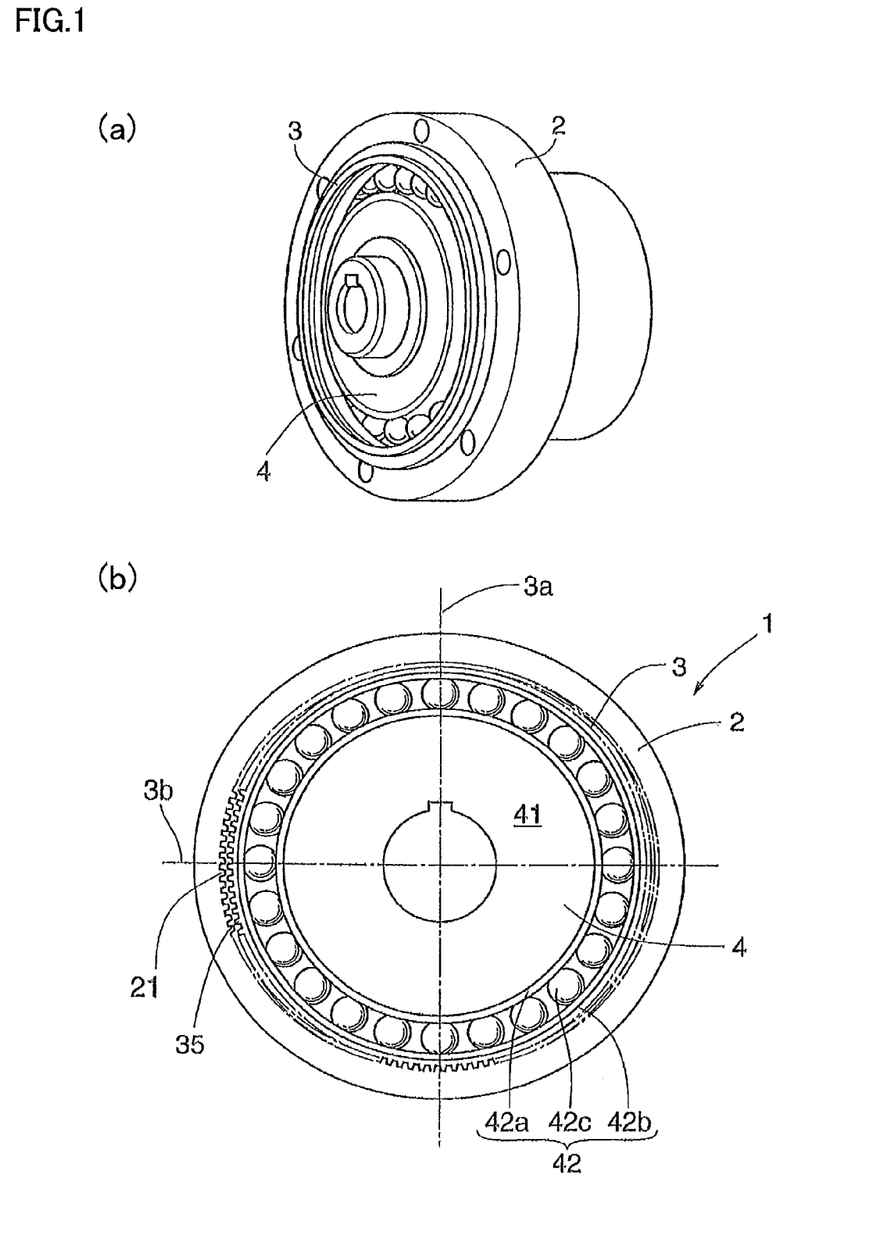
FIG. 1 is a perspective view and a schematic structural view showing a wave gear device.
Figure 2:
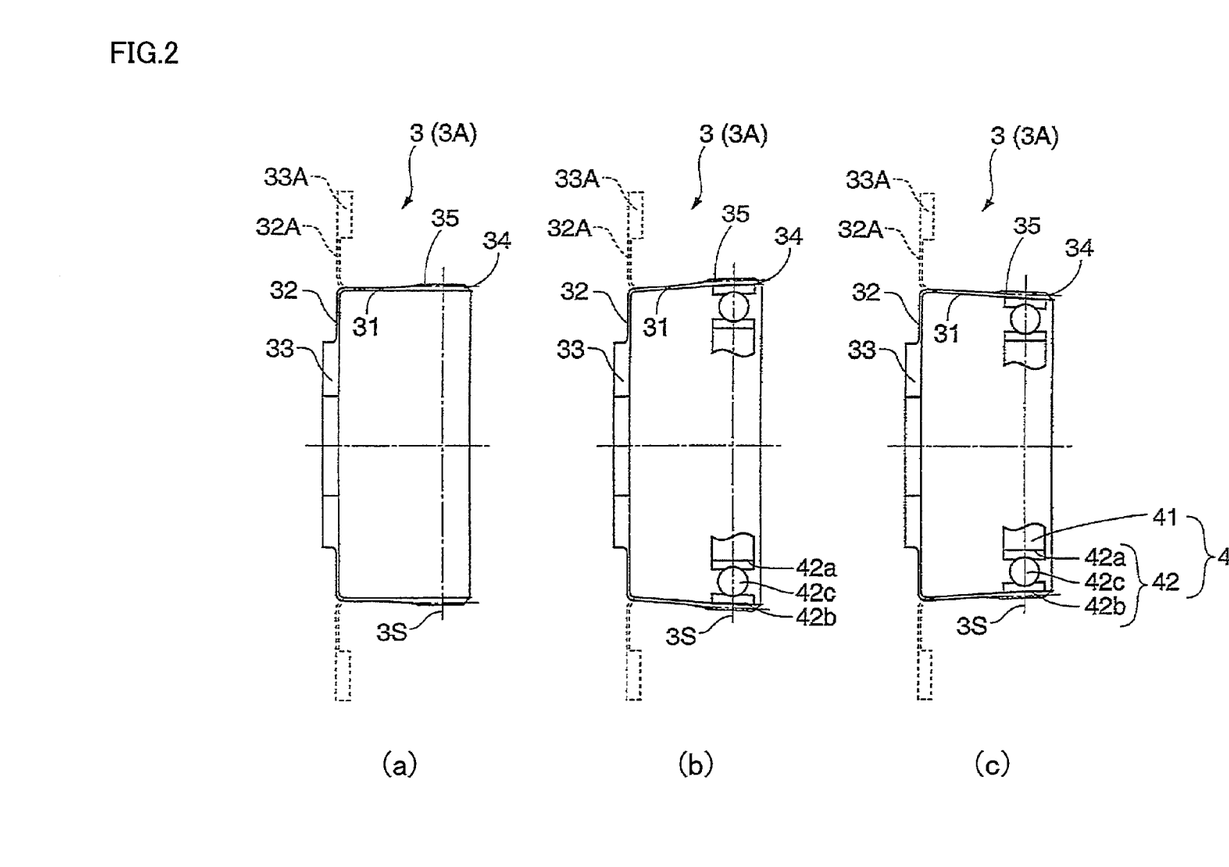
FIG. 2 is a diagram showing a cup-shaped or "silk hat"-shaped flexible externally toothed gear in a bent state.

A type of wave gear device having a cup-shaped or "silk hat"-shaped flexible externally toothed gear is known as the typical wave gear device. FIG. 1 is a perspective view of a cup-shaped wave gear device, and a schematic cross-sectional structural view showing a cross-section perpendicular to the axis of the wave gear device. FIG. 2 is a section through an axis showing a condition in which the opening of the cup-shaped flexible externally toothed gear has been bent into an elliptical shape, with (a) showing the pre-deformed shape, (b) being a cross-section including the major axis of the ellipse, and (c) being a cross-section including the minor axis. A "silk hat"-shaped flexible externally toothed gear is also shown in FIG. 2 by the broken line.

The cup-shaped wave gear device 1 comprises an annular rigid internally toothed gear 2, a cup-shaped flexible externally toothed gear 3 concentrically disposed inside the internally toothed gear 2, and an elliptically contoured wave generator 4 inserted in the externally toothed gear 3, as shown in the drawings. The cup-shaped flexible externally toothed gear 3 has a cylindrical body 31, an annular diaphragm 32 contiguous with one end thereof, an annular boss 33 integrally formed in the center part of the diaphragm 32, and external teeth 35 formed on the outer circumferential surface of the opening 34 of the body 31.

The diaphragm 32A of the "silk hat"-shaped flexible externally toothed gear 3A is an annular plate spreading outwardly in a radial direction, as shown by the broken line in FIG. 2. The annular boss 33A is shaped integrally along the outer circumferential edge of the diaphragm 32A.

The wave generator 4 has an elliptical rigid cam plate 41, and a wave bearing 42 fitted on the outer circumferential surface of the cam plate 41. The wave bearing 42 is composed of an inner race 42a, an outer race 42b, and a plurality of bearing balls 42c rollably mounted between the inner and outer races. The inner and outer races 42a, 42b are flexible.

The flexible externally toothed gear 3 is bent into an elliptical shape by the wave generator 4, and the external teeth 35 of the externally toothed gear 3 positioned on the major axis 3a of the ellipse mesh with the corresponding part of internal teeth 21 of the rigid internally toothed gear 2. In a cross-section perpendicular to the axis thereof, the cup-shaped or "silk hat"-shaped flexible externally toothed gear 3 (3A) repeatedly bends so as to create a deflection substantially proportional to the distance from the diaphragm, which is measured as the distance from the diaphragm to the opening. The bending deformation of the flexible externally toothed gear is referred to as "coning."

The flexible externally toothed gear meshes with the rigid internally toothed gear and transmits the load while being elliptically deformed by the elliptically shaped wave generator inserted inside the externally toothed gear. Therefore, in order to increase the load capacity, it is necessary to increase the bottom fatigue strength of the flexible externally toothed gear. The rim thickness of the flexible externally toothed gear is an important factor influencing the bottom fatigue strength thereof. A design is proposed in Patent Document 4 for optimizing the rim thickness of the flexible externally toothed gear in order to increase the bottom fatigue strength of the annular flexible externally toothed gear in a flat-type wave gear device.

In contrast, the external teeth of an externally toothed gear in a cup-type or "silk hat"-type wave gear device are bent and caused to mesh with the internal teeth of the rigid internally toothed gear so as to create a deflection substantially proportional to the distance from the diaphragm in the direction of the flank line of the external teeth, as discussed above. Therefore, it is necessary to optimize the effective face width of the external teeth that mesh with the internal teeth in order to increase the load capacity of wave gear devices.

In other words, the gear fatigue strength in a typical gear device where rigid gears mesh together increases as the face width of the external teeth increases. In contrast, in a cup-type or "silk hat"-type wave gear device, the external teeth of the flexible externally toothed gear, which is repeatedly subjected to bending deformation called "coning," mesh three-dimensionally with the internal teeth of the rigid internally toothed gears. The effect of the face width on the bottom fatigue strength of the flexible externally toothed gear therefore differs in accordance with the tooth profile of the external teeth of the flexible externally toothed gear in the direction of the flank line, the axial attachment position of the wave generator to the flexible externally toothed gear, and other factors. The bottom fatigue strength does not necessarily increase as the face width increases. Not only does increasing the face width beyond a reasonable limit fail to produce a satisfactory tooth flank load distribution across the entire face width, but the rigidity of the flexible externally toothed gear also increases, and elliptical deformation becomes harder to achieve, inviting the opposite effect of a decrease in the bottom fatigue strength of the flexible externally toothed gear.

It has been proposed in Patent Document 5 (JP-U 04-128558) to design the face width of the flexible externally toothed gear in a cup-type or "silk hat"-type wave gear device so that the length, measured in the flank direction, of the part where the external teeth are formed is limited to less than 24% of the pitch circle diameter thereof It has also been proposed in Patent Document 6 (JP-A 10-159917) that the length, measured in the flank direction, of the part where the external teeth are formed be reduced so as to have dimensions within the range of 5 to 14% of the pitch circle diameter thereof in order to flatten the wave gear device, and that a thin part be formed in the body adjacent to the teeth part to avoid poor meshing with the shortened external teeth.

PRIOR ART DOCUMENTS

Patent Documents

[Patent Document 1] U.S. Pat. No. 2,906,143
[Patent Document 2] JP-B 45-41171
[Patent Document 3] JP-A 7-167228
[Patent Document 4] JP-A 2008-180259

[Patent Document 5] JP-U 04-128558
[Patent Document 6] JP-A 10-159917

SUMMARY OF THE INVENTION

Problems the Invention is Intended to Solve

It is necessary to optimize the rim thickness of the flexible externally toothed gear and to optimize the meshing of the flexible externally toothed gear with the rigid internally toothed gear in order to strengthen a cup-type or "silk hat"-type wave gear device.

In light of the above, it is an object of the present invention to provide a heretofore unobtainable high-strength cup-type or "silk hat"-type wave gear device by optimizing the rim thickness and the effective face width of the flexible externally toothed gear.

Means for Solving the Problems

In order to solve the abovementioned problems, the present invention provides a wave gear device having:

an annular rigid internally toothed gear, an annular flexible externally toothed gear disposed inside the rigid internally toothed gear, and a wave generator for causing the flexible externally toothed gear to bend into an elliptical shape and partially mesh with the rigid internally toothed gear so that the enmeshment position of the gears moves in a circumferential direction;

wherein the flexible externally toothed gear is shaped as a cup or a "silk hat" provided with a cylindrical body, a diaphragm contiguous with one end of the body and extending inwardly or outwardly in a radial direction, and external teeth formed on an outer circumferential surface of an opening at the other end of the body; and wherein the flexible externally toothed gear is bent into an elliptical shape by the wave generator so as to create a deflection proportionate to a distance from the diaphragm, which is measured as the distance from the diaphragm to the opening; the wave gear device characterized in that the rim thickness t of the flexible externally toothed gear satisfies the following relations:

$$(0.5237 Ln(R) - 1.32)d \leq t \leq (0.8728 Ln(R) - 2.2)d \text{ if } R < 80, \text{ and}$$

$$(1.5499 Ln(R) - 5.8099)d \leq t \leq (2.5832 Ln(R) - 9.6832)d \text{ if } R \geq 80,$$

where d is a radial deflection, measured at the position of the major axis of the neutral circle of the rim, in the flexible externally toothed gear bent into an elliptical shape, and R is a reduction ratio of the wave gear device; and a ratio L/PCD is a value within a range from 21% to 30%, where L is an effective face width of the external teeth, and PCD is a pitch circle diameter of the external teeth. As used herein, the term "effective face width L" refers to the length, measured in the direction of the flank line, between circles resulting from the intersection between the chamfered surfaces on either end of the external teeth and a tip cylinder.

It is preferable that the hardness HRC of the material of the flexible externally toothed gear be set to a value within a range of 40 to 50.

It is also preferable that the axial attachment position of the wave generator relative to the flexible externally toothed gear be set so that the distance L1, as measured to the center position of the bearing balls of the wave generator from a circle resulting from the intersection between the chamfered surface on the side of the flexible externally toothed gear nearer the opening and the tip cylinder of the external teeth, be within a range of 50% to 60% of the effective face width L when the effective face width of the external teeth is set as described above.

Effect of the Invention

According to the present invention, setting the rim thickness of the flexible externally toothed gear as described above makes it possible to increase the bottom fatigue strength of the flexible externally toothed gear in a cup-type or "silk hat"-type wave gear device subjected to bending deformation, stretching deformation, and repeated flexural deformation (coning). Furthermore, optimizing the effective width of the external teeth of the flexible externally toothed gear makes it possible to obtain results whereby the bottom fatigue strength is enhanced by optimizing the rim thickness of the gear.

As a result, according to the present invention, it is possible to attain a cup-type or "silk hat"-type wave gear device having a markedly higher load capacity than in the prior art.

BEST MODE FOR CARRYING OUT THE INVENTION

Embodiments of a cup-type or "silk hat"-type wave gear device according to the present invention are described below with reference to the accompanying drawings. The entire structure of either the cup-type or "silk hat"-type wave gear device is the same as the typical structure shown in FIGS. 1 and 2.

(Rim Thickness of Flexible Externally Toothed Gear)

Figure 3:
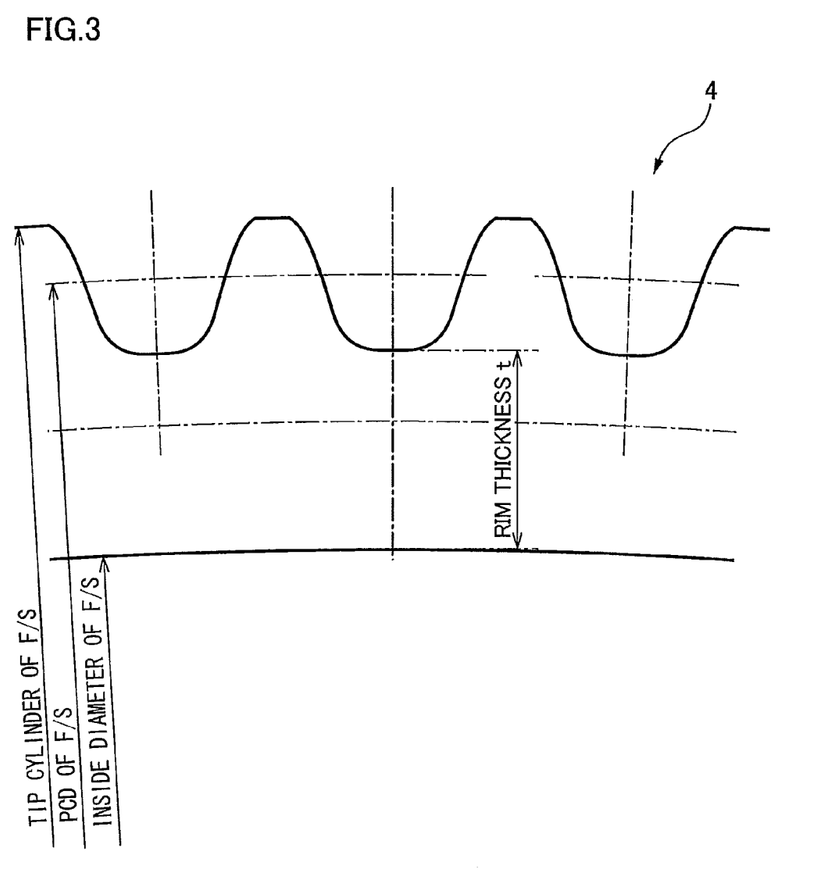
FIG. 3 is a conceptual diagram showing the rim thickness of a flexible externally toothed gear.

FIG. 3 is a conceptual diagram showing the rim thickness of a cup-shaped or "silk hat"-shaped flexible externally toothed gear in a cup-type or "silk hat"-type wave gear device. In the diagram, the rim thickness is the thickness of the portion designated by "t." The radial deflection d of the flexible externally toothed gear 3 bent into an elliptical shape by the elliptical wave generator 4 is the radial deflection, measured at the position of the major axis of the elliptical shape in the neutral circle of the rim, in an axially perpendicular cross-section perpendicular to the axis of the gear 3, at an arbitrary position in the tooth trace direction of the external teeth 35. The radial deflection d is equal to d, namely d=mn, where 2n (n is a positive integer) is the difference in the number of teeth between the flexible externally toothed gear 3 and a rigid internally toothed gear 2, and m is the module of the flexible externally toothed gear 3.

Figure 4:
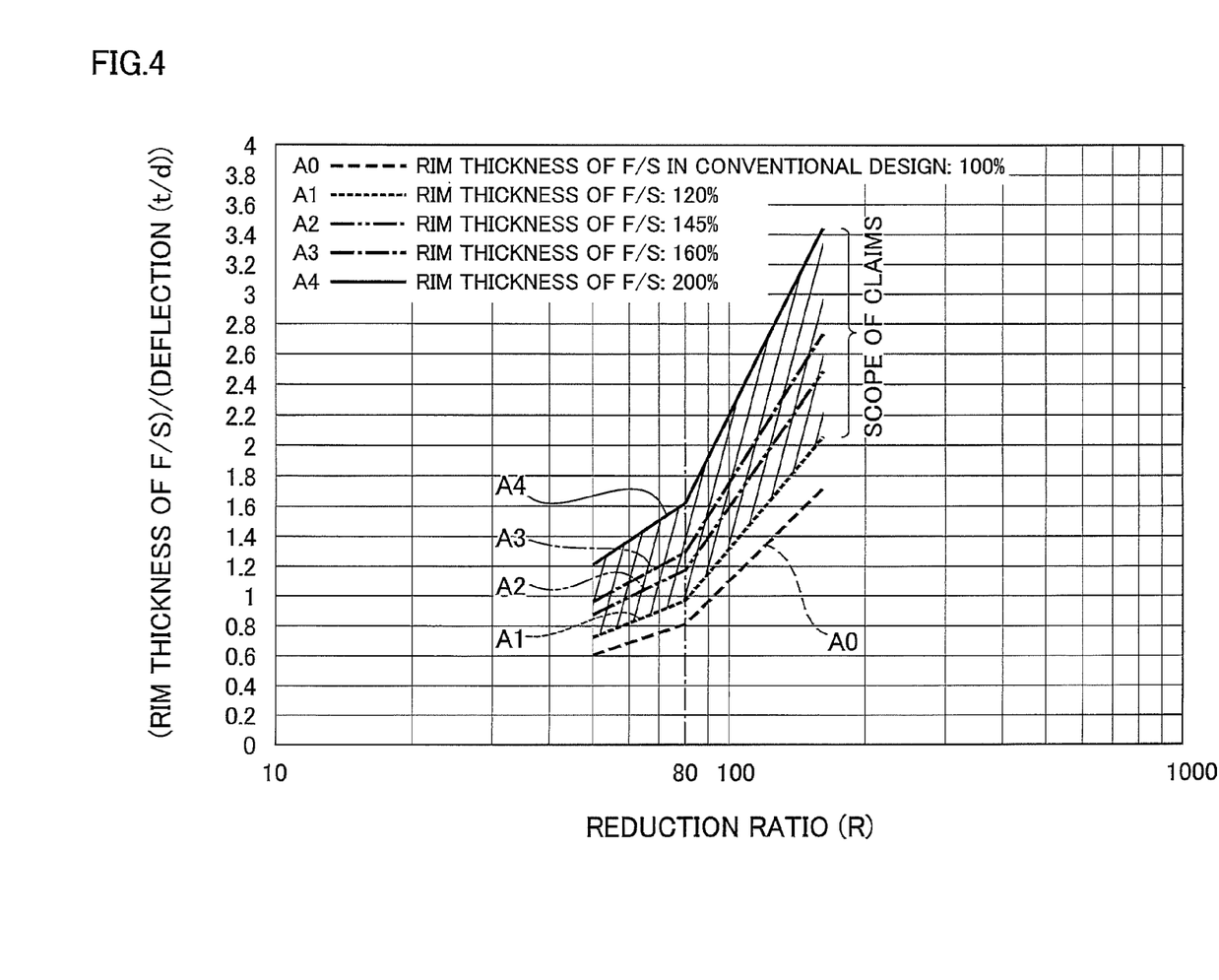
FIG. 4 is a graph showing the relationship between the reduction ratio and the ratio between rim thickness and radial deflection.

FIG. 4 is a graph showing the rim thickness of the flexible externally toothed gear 3 as well as the rim thickness of the flexible externally toothed gear of a typical cup-type or "silk hat"-type wave gear device according to the prior art. In the drawing, F/S represents a flexible external gear. The horizontal axis in the graph is the reduction ratio R of the wave gear device, and the vertical axis is the ratio t/d between the rim thickness t and the radial deflection d.

In the graph, the broken line A0 shows the relationship between the reduction ratio and the rim thickness of the flexible externally toothed gear in a conventional wave gear device. By contrast, broken lines A1 to A4 show the relationship between the reduction ratio and the rim thickness of the flexible externally toothed gear as specified by the present invention. The broken line A1 to A4 shows a case in which the rim thickness is increased 20%, 45%, 60%, and 100%, respectively, relative to a design value to of the conventional rim thickness shown by the broken line A0.

The broken line A1 specifies the lower limit of the rim thickness t. The part of the broken line A1, for which the reduction ratio R is less than 80, is expressed by Formula 1, and the part thereof, for which the reduction ratio R is 80 or above, is expressed by Formula 2.

$$t/d = 0.5237 Ln(R) - 1.32 \quad \text{(Formula 1)}$$

$$t/d = 1.5499 Ln(R) - 5.8099 \quad \text{(Formula 2)}$$

The broken line A4 specifies the upper limit of the rim thickness t. The part of the line A4, for which the reduction ratio R is less than 80, is expressed by Formula 3, and the part thereof, for which the reduction ratio R is 80 or above, is expressed by Formula 4.

$$t/d = 0.8728 Ln(R) - 2.2 \quad \text{(Formula 3)}$$

$$t/d = 2.5832 Ln(R) - 9.6832 \quad \text{(Formula 4)}$$

Therefore, the section shown by the diagonal lines in FIG. 4 is the range of the rim thicknesses t according to the present invention. Rim thicknesses within a range of approximately 120% to 200% of the rim thickness according to conventionally designed models are within the range described by the present invention.

Next, the critical meaning of the upper and lower limits of the rim thickness t according to the present invention will be described.

Figure 5:
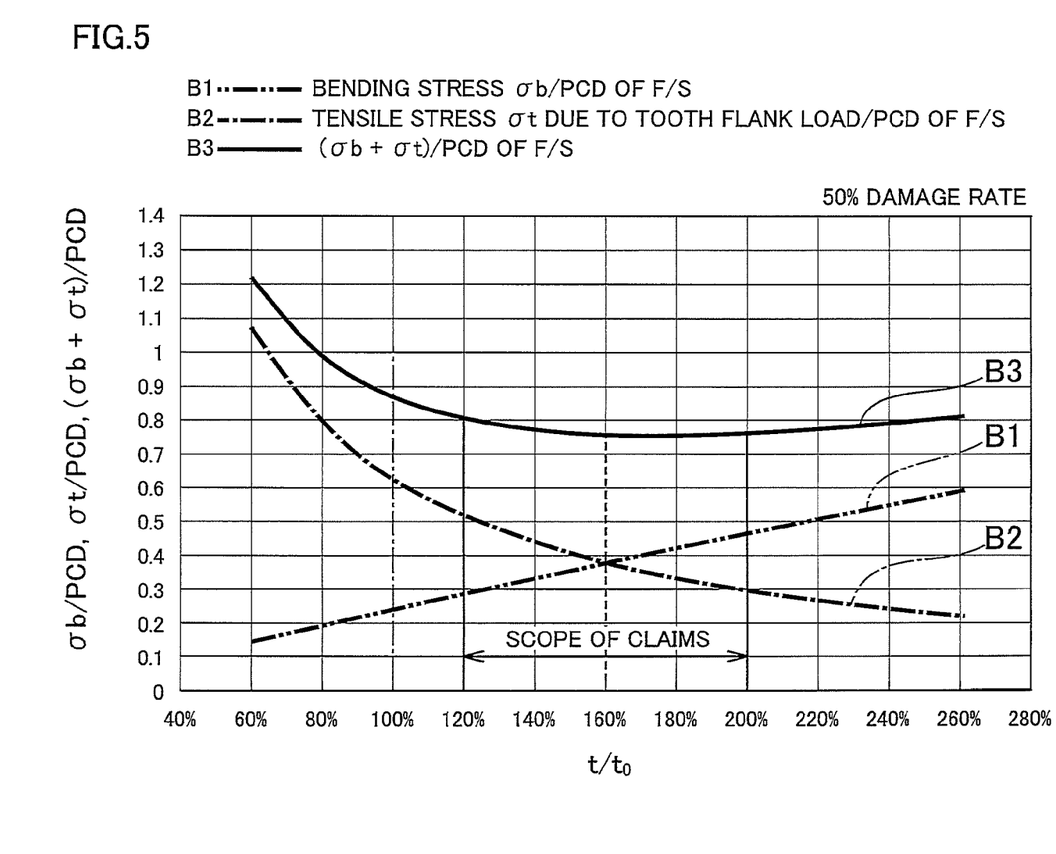
FIG. 5 is a graph showing the relationship between the rim thickness and the bending stress and tensile stress.

FIG. 5 is a graph showing the relationship of the rim thickness t with the bending stress σb and tensile stress σt created in the flexible externally toothed gear, as well as with the total stress (σb+σt) of the bending stress and the tensile stress. The horizontal axis is the ratio (%) between the rim thickness t of the flexible externally toothed gear and the rim thickness to of conventional design models. The vertical axis is the ratio between the bending stress σb, the tensile stress σt, and (σb+σt), and a pitch circle diameter (PCD) of the flexible externally toothed gear.

As shown by the line B1, the bending stress σb increases substantially proportionally to the rim thickness; however, as shown by the line B2, the tensile stress at decreases as the rim thickness increases. As a result, as shown by the line B3, the total stress (σb+σt) decreases until the rim thickness is approximately 160% of the rim thickness of conventional design models, after which there is a slight, gradual increase.

At the rim thickness of a conventional design model (the 100% position on the horizontal axis), the total stress is high and the rim thickness cannot be optimized. In contrast, in the range of the present invention (the range from 120% to 200% on the horizontal axis), a range in which the total stress is minimized is achieved, making it clear that the rim thickness can be optimized. In particular, the total stress increases when the thickness is no more than 120%, which is the lower limit, making it clear that bringing the rim thickness t beyond that value is desirable.

Figure 6:
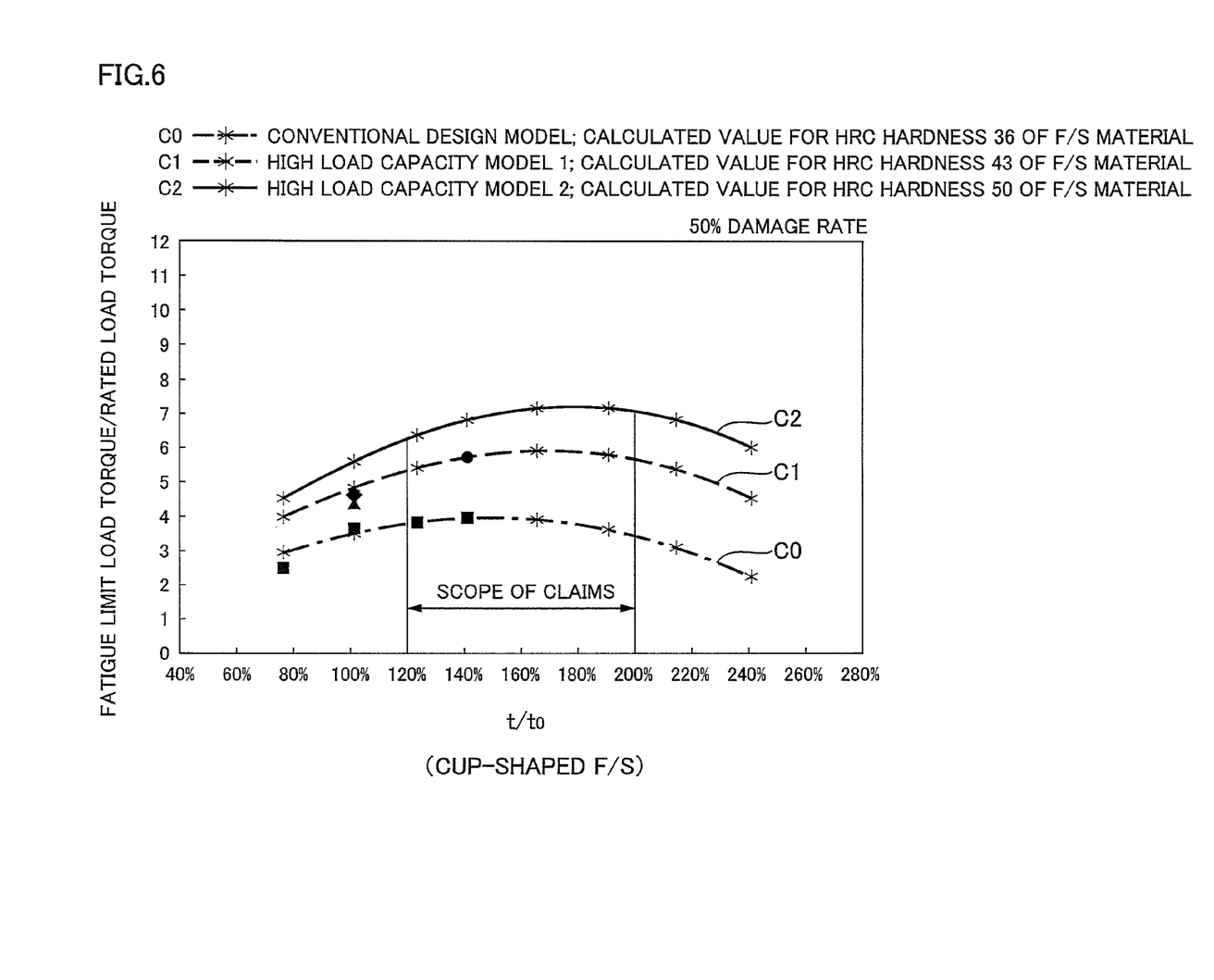
FIG. 6 is a graph showing the relationship between the rim thickness of a cup-shaped flexible externally toothed gear and the fatigue limit load torque.

Next, FIG. 6 is a graph showing the results of calculations of the bottom strength of a cup-shape flexible externally toothed gear for a variable rim thickness of the externally toothed gear at different hardness levels. The horizontal axis, the same as in FIG. 5, is the ratio (%) between the rim thickness t of the flexible externally toothed gear and the rim thickness to of conventional design models. The vertical axis is the ratio between the bottom fatigue limit load torque and the rated load torque of the flexible externally toothed gear. In the graph, curve C0 represents a case in which the hardness HRC of the material is 36, curve C1 represents a case in which the hardness HRC of the material is 43, and curve C2 represents a case in which the hardness HRC of the material is 50.

As can be seen from these curved lines, the fatigue limit load torque increases with increased rim thickness increases, but when the rim thickness exceeds a certain value, the pattern reverses and the fatigue limit load torque decreases instead. It is apparent that the maximum value for the fatigue limit load torque occurs in the range of the present invention (the range from 120% to 200% on the horizontal axis).

An increase in the hardness HRC of the material causes the position of the fatigue limit load torque to move toward greater rim thicknesses, and when the hardness HRC of the material reaches approximately 50, the maximum value occurs at substantially the 200% position on the horizontal axis. It is currently difficult to machine a flexible externally toothed gear having flexibility in the radial direction using a material whose hardness HRC is greater than approximately 50. The rim thickness can be set so as to maximize the fatigue limit load torque with a material whose hardness can be used for practical purposes in cases in which the rim thickness is at or below 200%, which is the upper limit value of the present invention.

It is also understood from the graph in FIG. 6 that the fatigue limit load torque can be markedly improved over the conventional design models (curve C0 in FIG. 6) by specifying the rim thickness as described above, and manufacturing the flexible externally toothed gear from a material having a hardness higher than the HRC 36 typically used in the prior art.

For example, the fatigue limit load torque was confirmed to have been improved twice or greater over the value of conventional design models (hardness HRC of the material: 36) when the rim thickness shown by broken line A2 in FIG. 4 was set to 145% of the conventional design models, and a material having a hardness of HRC 43 was used.

Figure 7:
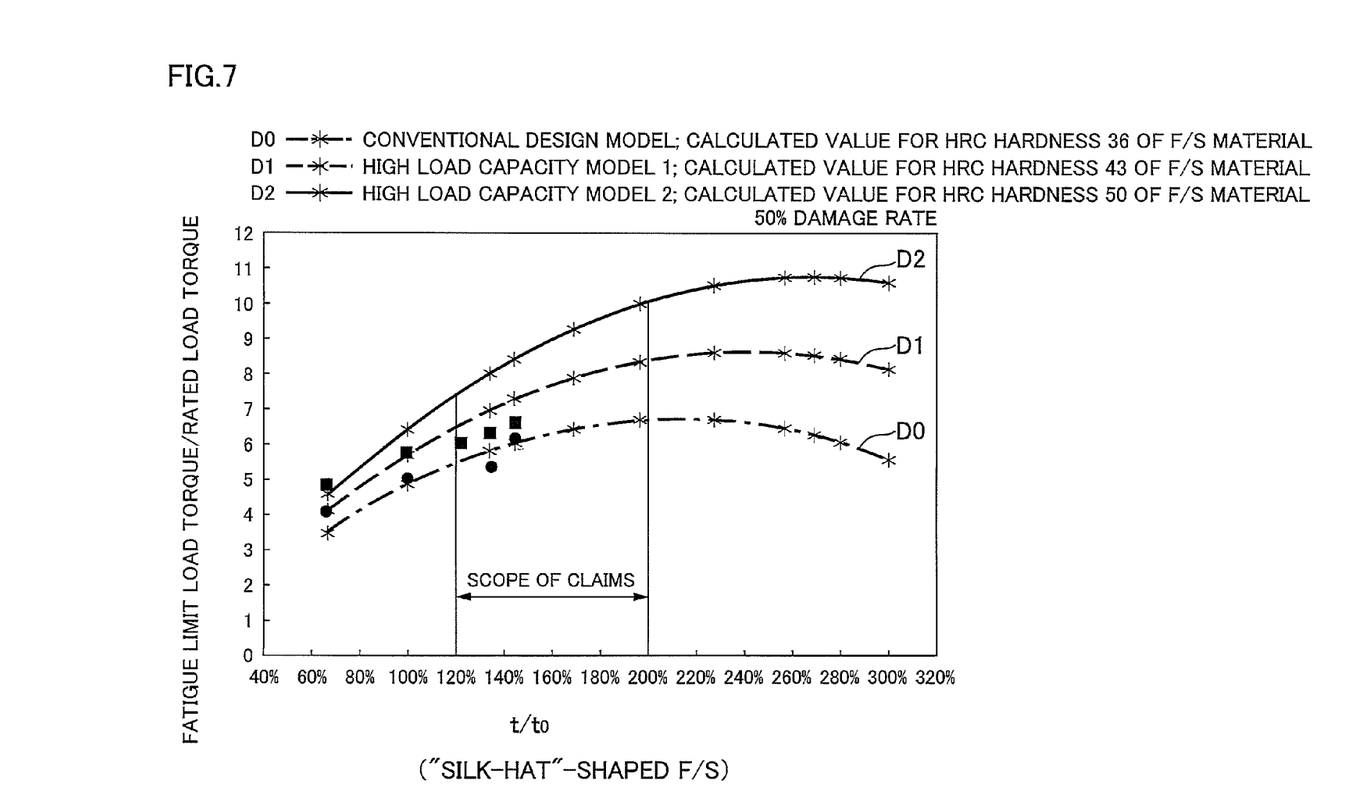
FIG. 7 is a graph showing the relationship between the rim thickness of a "silk hat"-shaped flexible externally toothed gear and the fatigue limit load torque.

Similar to FIG. 6, FIG. 7 is a graph showing the results of calculations of the bottom strength of a "silk hat"-shaped flexible externally toothed gear for a variable rim thickness of the externally toothed gear. In the graph, curve D0 represents a case in which the hardness HRC of the material is 36, curve D1 represents a case in which the hardness HRC of the material is 43, and curve D2 represents a case in which the hardness HRC of the material is 50.

As can be seen from these curved lines, the fatigue limit load torque increases with increased rim thickness, but when the rim thickness exceeds a certain value, the pattern reverses and the fatigue limit load torque decreases instead. The fatigue limit load torque increases as the rim thickness increases within the range of the present invention (the range from 120% to 200% on the horizontal axis). An increase in the hardness HRC of the material causes the position of the fatigue limit load torque to move toward greater rim thicknesses. When the hardness HRC of the material reaches approximately 50, the maximum value occurs at substantially the 260% position on the horizontal axis. It is currently problematic to machine a flexible externally toothed gear having flexibility in the radial direction using a material whose hardness HRC exceeds approximately 50; the flexible externally toothed gear becomes too rigid and is impractical when the thickness exceeds 200%. According to the present invention, the rim thickness can be set so as to maximize the fatigue limit load torque with a material whose hardness can be used for practical purposes in cases in which the rim thickness is at or below 200%, which is the upper limit value of the present invention.

It is also understood from the graph in FIG. 7 that the fatigue limit load torque can be markedly improved over the conventional design models (curve D0 in FIG. 7) by specifying the rim thickness as described above, and manufacturing the flexible externally toothed gear from a material having a hardness higher than the HRC 36 typically used in the prior art.

It has been recognized in the prior art that the fatigue limit strength of the flexible externally toothed gear increases until the hardness of the material of the flexible externally toothed gear reaches HRC 40, and that the pattern reverses and the fatigue limit strength decreases when a material whose hardness exceeds this level is used. It has been confirmed, however, that the fatigue limit strength of the flexible externally toothed gear can be raised even when the hardness of the material is HRC 40 or greater, as shown in FIGS. 6 and 7. Tests conducted by the present inventors have confirmed that the hardness of the material should preferably fall within the range of HRC 40 to 50 when a rim thickness according to the present invention is used. In particular, it is preferable to use a material whose hardness falls within the range of HRC 40 to 43.

(Effective Face Width of External Teeth)

Next, the effective tooth width of a flexible externally toothed gear will be described with reference to FIG. 8. The ratio L/PCD is set to within the range from 21% to 30%, where L is the effective face width of the external teeth 35 of the flexible externally toothed gear 3, and PCD is the pitch circle diameter of the external teeth 35. The effective face width L is the length, as measured in the tooth trace direction, between circles 36a, 39a resulting from the intersection between the chamfered surfaces 36, 39 on either end of the external teeth 35 and the tip cylinder 37, as shown in FIG. 8.

In a flexible externally toothed gear whose tooth width falls outside of the effective face width range, optimizing the rim thickness t as described above sometimes still fails to adequately demonstrate the results whereby the tooth base fatigue strength is increased as a result of these actions. Optimizing the effective face width in accordance with the present invention makes it possible to obtain reliable results whereby the tooth base fatigue strength is increased by optimizing the rim thickness at the tooth base.

It is effective to appropriately set the axial attachment position of the wave generator and the shape of the external teeth in the direction of the flank line in order to allow the flexible externally toothed gear to appropriately mesh with the rigid internally toothed gear.

Figure 8:
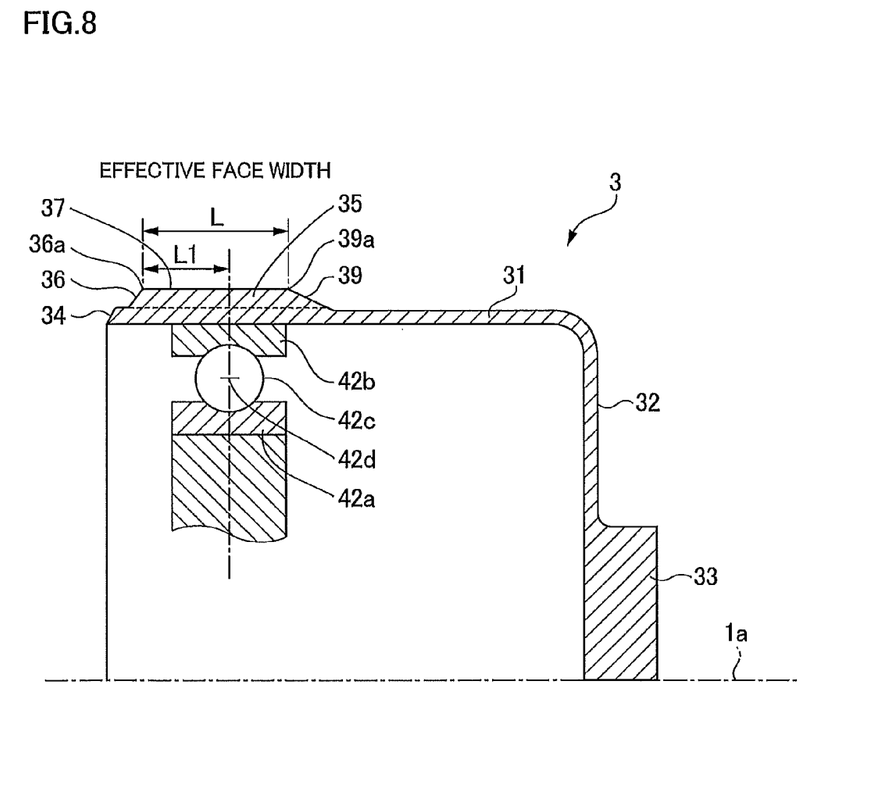
FIG. 8 is a half-sectional view of a cup-type wave gear device.

For example, the axial attachment position of the wave generator 4 is preferably set as shown in FIG. 8. The distance L1, as measured to the ball center 42d of the bearing balls 42c of the wave generator 4 from a circle 36a resulting from the intersection between the chamfered surface 36 on the side of the flexible externally toothed gear 3 nearer the opening 34 and the tip cylinder 37 of the external teeth 35, is preferably set so as to be within a range of 50% to 60% of the effective face width L.

The invention claimed is:

1. A wave gear device having an annular rigid internally toothed gear, an annular flexible externally toothed gear disposed inside the rigid internally toothed gear, and a wave generator for causing the flexible externally toothed gear to bend into an elliptical shape and partially mesh with the rigid internally toothed gear so that enmeshment position of the gears moves in a circumferential direction;

wherein the flexible externally toothed gear is shaped as a cup or a "silk hat" provided with a cylindrical body, a diaphragm contiguous with one end of the body and extending inwardly or outwardly in a radial direction, and external teeth formed on an outer circumferential surface of an opening at the other end of the body; and wherein the flexible externally toothed gear is bent into an elliptical shape by the wave generator so as to create a deflection proportionate to a distance from the diaphragm, which is measured as the distance from the diaphragm to the opening; wherein:

a rim thickness t of the flexible externally toothed gear satisfies the following relations:

$(0.5237 Ln(R) - 1.32)d \leq t \leq (0.8728 Ln(R) - 2.2)d$ if $R < 80$, and $(1.5499 Ln(R) - 5.8099)d \leq t \leq (2.5832 Ln(R) - 9.6832)d$ if $R \geq 80$, where d is a radial deflection, measured at a position of a major axis of a neutral circle of the rim, in the flexible externally toothed gear bent into an elliptical shape, and R is a reduction ratio of the wave gear device; and wherein a ratio L/PCD is a value within a range from 21% to 30%, where L is an effective face width of the external teeth, and PCD is a pitch circle diameter of the external teeth.

2. The wave gear device according to claim 1, wherein the hardness HRC of a material of the flexible externally toothed gear is set to a value within a range of 40 to 50.

3. The wave gear device according to claim 1, wherein a center of a bearing ball of the wave generator is positioned within a range of 50 to 65% of an effective face width L of the external teeth along a tooth trace direction of the external teeth from a circle of intersection that defines a position resulting from the intersection between a tip cylinder of the external teeth and a chamfered surface provided to that end of the external teeth which is nearer the opening of the body in the tooth trace direction.

4. The wave gear device according to claim 2, wherein a center of a bearing ball of the wave generator is positioned within a range of 50 to 65% of an effective face width L of the external teeth along a tooth trace direction of the external teeth from a circle of intersection that defines a position resulting from the intersection between a tip cylinder of the external teeth and a chamfered surface provided to that end of the external teeth which is nearer the opening of the body in the tooth trace direction.

* * * * *